(12) United States Patent
Shih et al.

(10) Patent No.: US 6,966,023 B2
(45) Date of Patent: Nov. 15, 2005

(54) ENCODING METHOD FOR AN OPTICAL RECORDER

(75) Inventors: Tsung-Yueh Shih, Hsin-Chu Hsien (TW); Jenn-Ning Yang, Hsin-Chu Hsien (TW); Chi-Mou Chao, Hsin-Chu Hsien (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 606 days.

(21) Appl. No.: 09/683,847

(22) Filed: Feb. 21, 2002

(65) Prior Publication Data

US 2003/0167435 A1    Sep. 4, 2003

(51) Int. Cl.⁷ ............................................. H03M 13/00
(52) U.S. Cl. ...................... 714/756; 714/784
(58) Field of Search .............................. 714/746, 755, 714/784, 763, 768, 756, 758; 382/246; 365/125; 386/123; 710/8

(56) References Cited

U.S. PATENT DOCUMENTS

| | | | |
|---|---|---|---|
| 4,914,523 A * | 4/1990 | Maruta | 386/35 |
| 5,285,438 A * | 2/1994 | Marchand et al. | 369/103 |
| 5,319,629 A * | 6/1994 | Henshaw et al. | 369/103 |
| 5,379,120 A * | 1/1995 | Honjo | 386/122 |
| 5,412,592 A * | 5/1995 | Krishnamoorthy et al. | 365/49 |
| 6,044,199 A * | 3/2000 | Oda et al. | 386/98 |
| 6,188,793 B1 * | 2/2001 | Kimura et al. | 382/238 |
| 6,307,842 B1 * | 10/2001 | Nakata et al. | 370/254 |

* cited by examiner

*Primary Examiner*—Albert Decady
*Assistant Examiner*—Mujtaba Chaudry
(74) *Attorney, Agent, or Firm*—Winston Hsu

(57) ABSTRACT

An encoding method for an optical recorder provides an optical recorder with an encoder for encoding data received from a computer. Additionally, the optical recorder includes a processor for controlling operations of the encoder. The encoding method includes receiving data of a next mode, which is different from a current mode, from the computer even when the encoder is still encoding data of the current mode.

25 Claims, 6 Drawing Sheets

ENCODING METHOD FOR AN OPTICAL RECORDER

BACKGROUND OF INVENTION

1. Field of the Invention

The present invention relates to an encoding method, and more particularly, to an encoding method for an optical recorder.

2. Description of the Prior Art

In recent years, the use of compact discs (CDs) as a storage medium has risen dramatically. As a result, optical recorders such as CD recordable (CD-R) and CD-rewritable (CD-RW) drives have entered the mainstream electronics market. Through the use of these optical recorders, information can be stored on a CD in different modes, which include audio and data. In addition, CDs can be created that include both audio and data on the same disc.

Typically, data from a host computer is encoded by the optical recorder, and then stored on the CD. According to the Orange Book standard, a CD can be written to in several different formats: track at once (TAO), session at once (SAO), disc at once (DAO), and Packet write. Each track written using TAO can either be an audio track or a data track. On the other hand, SAO allows both data and audio to be written using a single session. Likewise, DAO also allows both data and audio to be written on the same disc. Packet write allows only data to be written.

However, prior art optical recorders have a severe limitation when writing both audio and data modes to a CD when using either SAO or DAO formats. An encoder located in the optical recorder is not able to receive data from the computer in one mode while encoding data of another mode. To help illustrate this limitation, please refer to FIG. 1. FIG. 1 is a timing diagram showing tracks that will be written to a CD using different modes. The receiving process is begun at time t0 when information represented in first audio track 12 is continuously sent from the computer to a buffer on the optical recorder. Then, the optical recorder encodes information of the first audio track 12, and it will continue to record the information from the buffer to the disc.

Immediately following the first audio track 12 is a first data track 14. Since the first audio track 12 and the first data track 14 are not in the same mode, the optical recorder stops receiving and encoding information at time t1.

After the encoding process for the first audio track 12 is completed, and the buffer starts to receive and encode the first data track 14 from the computer. At time t2, the entire first data track 14 has been received. Even so, since a second audio track 16 follows the first data track 14, and the two modes are not identical, the encoder must finish encoding the first data track 14 before the second audio track 16 can be received.

Whenever the receiving process is temporarily stopped, there exists a possibility of buffer under-run. That is, if the recording process is faster than the encoding process, buffer under-run occurs and the compact disc is potentially ruined. Referring again to FIG. 1, at times t1 and t2 a potential for buffer under-run exists since at that time the buffer contains no information for recording about the next track.

SUMMARY OF INVENTION

It is therefore a primary objective of the claimed invention to provide an encoding method for an optical recorder for solving the above-mentioned problems.

According to the claimed invention, an encoding method for an optical recorder provides an optical recorder with an encoder for encoding data received from a computer. Additionally, the optical recorder includes a processor for controlling operations of the encoder. The encoding method comprises receiving data of a next mode, which is different from a current mode, from the computer even when the encoder is still encoding data of the current mode.

It is an advantage of the claimed invention that the optical recorder receives data of the next mode while encoding data of the current mode in order to reduce the occurrence of buffer under-run.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
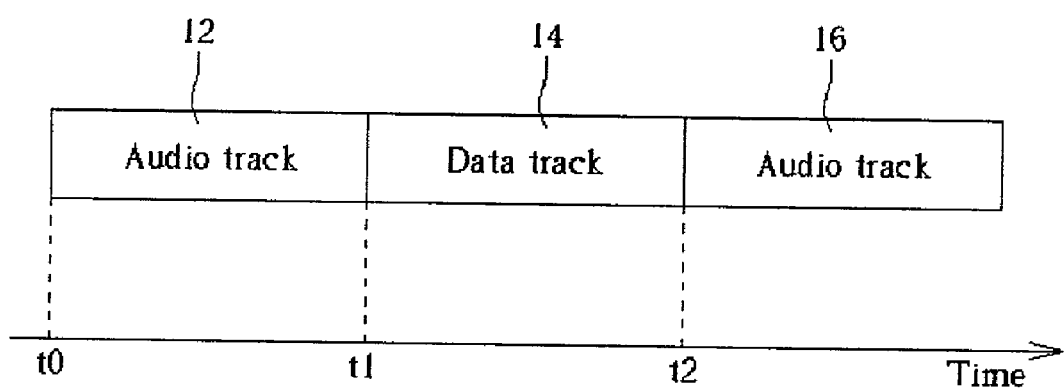
FIG. 1 is a timing diagram showing tracks that will be written to a CD using different modes.
Figure 2:
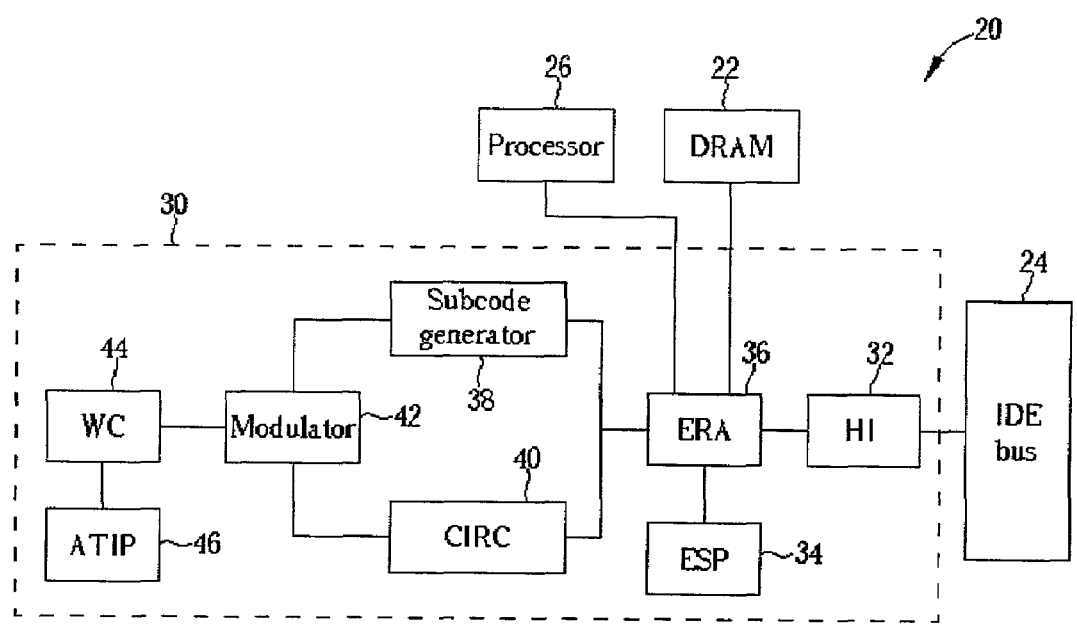
FIG. 2 is a block diagram of an optical recorder according to the present invention.

Please refer to FIG. 2. FIG. 2 is a block diagram of an optical recorder 20 according to the present invention. The optical recorder 20 comprises an encoder 30 for encoding data received from a computer, and a processor 26 for controlling operations of the encoder 30. Furthermore, the optical recorder 20 includes a DRAM buffer 22 for storing data transmitted from the computer. When the computer sends data to the encoder 30, the data is first stored in the DRAM buffer 22 before being encoded. The data from the computer is sent to the encoder 30 through an Integrated Drive Electronics (IDE) bus 24.

The encoder 30 further comprises a host interface (HI) 32 electrically connected to the IDE bus 24 for receiving data from the computer. An encoder sector processor (ESP) 34 is used to encode data according to a mode of the data such as audio mode and data mode. An encoder RAM arbiter (ERA) 36 is connected to the HI 32, the DRAM buffer 22, and the ESP 34. The ERA 36 is used to store data from the HI 32 into the DRAM buffer 22, for transferring data in the DRAM buffer 22 to the ESP 34, and for storing data encoded by the ESP 34 into the DRAM buffer 22.

Moreover, the encoder 30 also includes a subcode generator 38 connected to the ERA 36 for generating sub-channel data, and a cross interleave reed-solomon code (CIRC) 40 connected to the ERA 36 for generating main channel data. The encoder 30 uses an 8-to-14 modulator 42 connected to both the subcode generator 38 and the CIRC 40 for converting the sub-channel data and the main channel data in order to generate a serial data stream. Then, the serial data stream is converted into switch commands by a write controller (WC) 44 connected to the modulator 42. These switch commands are used by the WC 44 to control write strategy of the encoder 30. The encoder 30 receives absolute time information from an absolute time in pre-groove decoder (ATIP decoder) 46 connected to the WC 44.

The encoding method for the present invention optical recorder 20 involves a series of steps. First, The HI 32 is used to receive data from the computer. Then, the ERA 36 stores data from the HI 32 into the DRAM buffer 22, and transfers data in the DRAM buffer 22 to the ESP 34. The ESP 34 then encodes data transmitted from the ERA 36 according to modes of the data. These modes include data mode and audio mode, although other modes may be used as well. When the ESP 34 finishes encoding data, the ERA 36 overwrites data stored in the DRAM buffer 22 with data encoded by the ESP 34. Next, the subcode generator 38 generates sub-channel data, and the CIRC 40 interleaves data, which was encoded by the ESP 34 and is stored in the DRAM buffer 22, to generate main channel data. Finally, the modulator 42 converts the subchannel data and the main channel data into a serial data stream. The WC 44 then converts the serial data stream into switch commands of write strategy and outputs the switching commands with reference to the absolute time information provided by the ATIP decoder 46.

Figure 3:
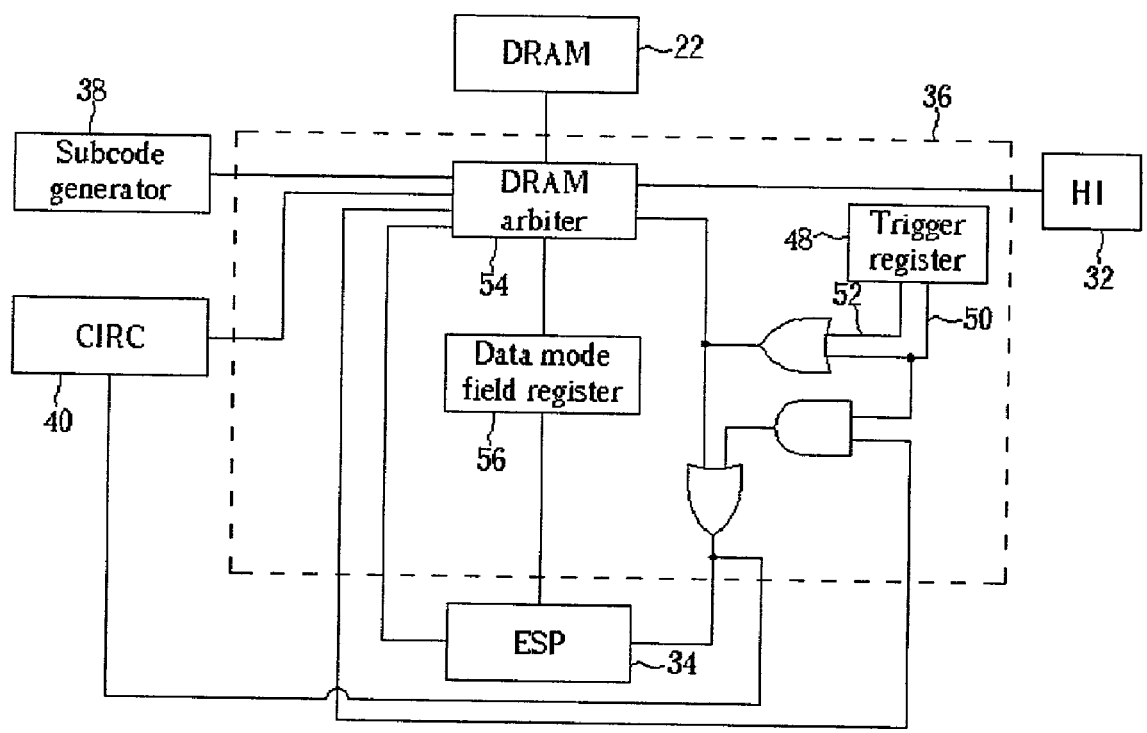
FIG. 3 is a block diagram of an encoder RAM arbiter (ERA) of the optical recorder.

Please refer to FIG. 3. FIG. 3 is a block diagram of the ERA 36 of the optical recorder 20. The ERA 36 comprises a trigger register 48 for generating initial triggers 52 and change mode triggers 50. Specifically, the trigger register 48 outputs one change mode trigger 50 in order to latch last data that was stored in the DRAM buffer 22. The change mode trigger 50 also notifies the ESP 34 and the subcode generator 38 that the last data and data following the last data need to be encoded with the next mode. Then, a mode type of the next mode is stored in a data mode field register 56. When the change mode trigger 50 is received from the trigger register 48, the data mode field register 56 is updated with the next mode. In addition, the ERA 36 further comprises a DRAM arbiter 54 that is used to access data stored in the DRAM buffer 22.

Figure 4:
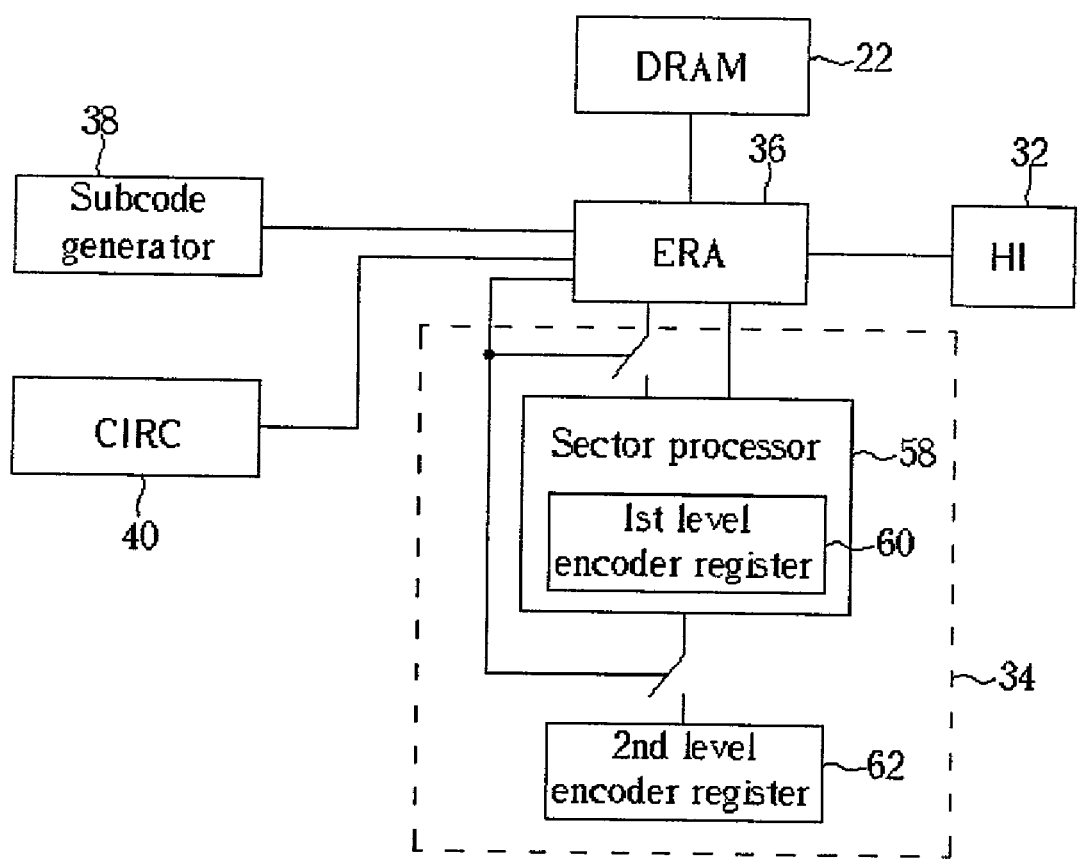
FIG. 4 is a block diagram of an encoder sector processor (ESP) of the optical recorder.

Please refer to FIG. 4. FIG. 4 is a block diagram of the ESP 34 of the optical recorder 20. The ESP 34 comprises a sector processor 58 for encoding data transmitted from the ERA 36, a first level encoder register 60 for storing a data format of the current mode, and a second level encoder register 62 for storing a data format of the next mode. During the encoding process, the ESP 34 is notified that the last data and data following the last data need to be encoded with the next mode when receiving the latched data from the ERA 36. Then, the data format of the next mode is loaded from second level encoder register 62 into the first level encoder register 60.

Figure 5:
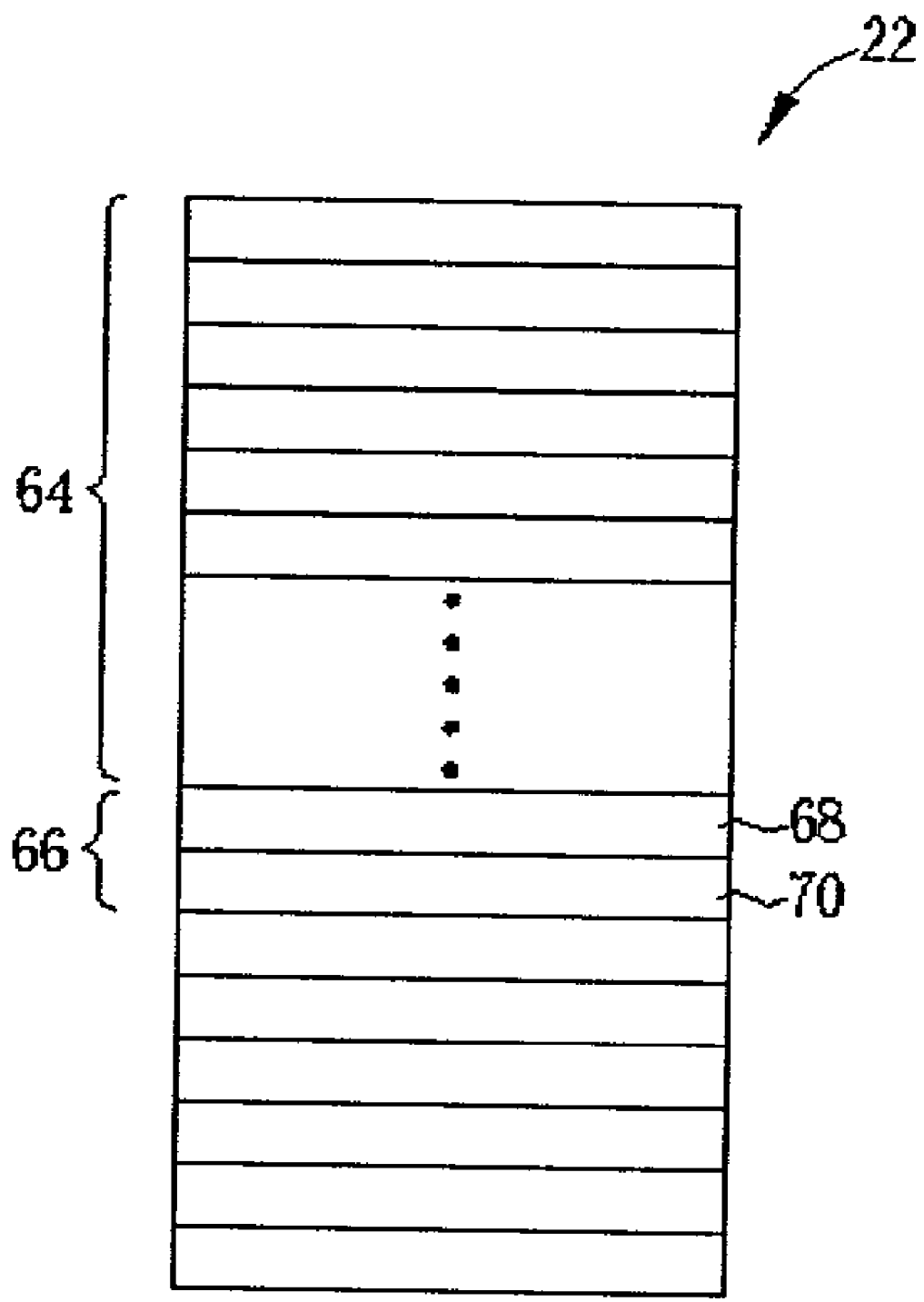
FIG. 5 is a block diagram of a DRAM buffer of the optical recorder.

Please refer to FIG. 5. FIG. 5 is a block diagram of the DRAM buffer 22 of the optical recorder 20. The DRAM buffer 22 comprises a sector data area 64 for storing data transmitted from the HI 32 and data encoded by the ESP 34, and a Q channel program page area 66 for storing program codes for the subcode generator 38. During the encoding process, program codes of the current mode can be stored in a first storage space 68 in the Q channel program page area 66. Likewise, program codes of the next mode can be stored in a second storage space 70 in the Q channel program page area 66. Later, when the encoding mode of the optical recorder 20 changes, the next mode program codes stored in the second storage space 70 will be referred to as the current mode program codes. Similarly, the following mode program codes will be referred to as the next mode program codes, and will be stored in the first storage space 68. In this way, the first storage space 68 and the second storage space 70 will alternatively hold the current mode and next mode program codes.

Figure 6:
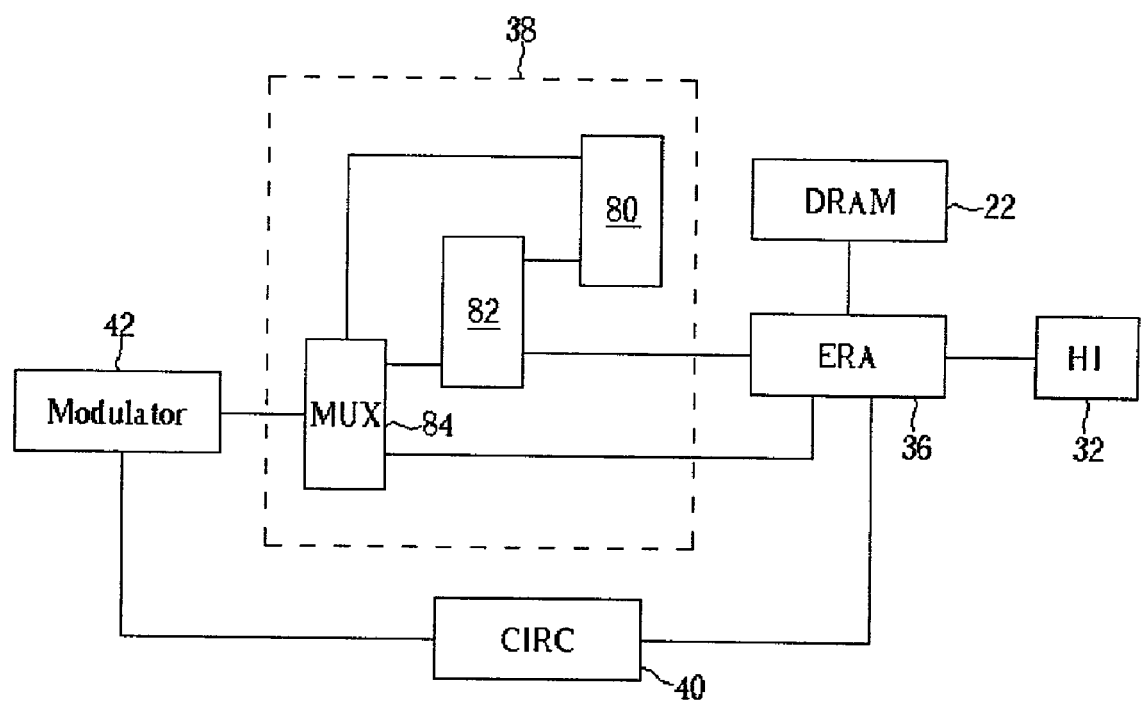
FIG. 6 is a block diagram of the subcode generator of the optical recorder.

Please refer to FIG. 6. FIG. 6 is a block diagram of the subcode generator 38 of the optical recorder 20. The subcode generator 38 comprises a subcode source register 80 for selecting a source of the sub-channel data, a sub-channel auto generator 82 for generating sub-channel data, and a multiplexer 84 for outputting sub-channel data. The subcode source register 80 is used to select a source on the multiplexer 84 in order to receive program codes from the Q channel program page area 66 or to receive sub-channel data from the sector data area 64. The sub-channel auto generator 82 is used to generate the sub-channel data according to the program codes if the Q-channel program page area 66 is selected. The multiplexer 84 is used to output the sub-channel data received from the sub-channel auto generator 82 if the Q-channel program page area 66 is selected, or to output the sub-channel data received from the sector data area 64 if the sector data area 64 is selected.

Compared to the prior art, the present invention optical recorder 20 is capable of receiving data of the next mode while simultaneously encoding data of the current mode. By receiving the data of the next mode well before the next mode data is encoded, the optical recorder 20 significantly reduces the likelihood that buffer under-run will occur.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An encoding method for an optical recorder, the optical recorder including an encoder for encoding data received from a computer for storage on an optical disc, a processor for controlling operations of the encoder, a buffer for storing data transmitted from the computer; wherein the encoder includes a host interface for receiving data from the computer; an encoder sector processor for encoding data according to modes of the data; an encoder buffer arbiter connected to the host interface, the buffer and the encoder sector processor for storing data from the host interface into the buffer, transferring data in the buffer to the encoder sector processor, and storing data encoded by the encoder sector processor into the buffer; a subcode generator connected to the encoder buffer arbiter for generating sub-channel data; a cross interleave reed-solomon code (CIRC) connected to the encoder buffer arbiter for generating main channel data; a modulator connected to the subcode generator and the CIRC for converting the sub-channel data and the main channel data so as to generate a serial data stream; a write controller connected to the modulator for converting the serial data stream into switch commands of write strategy; and an absolute time in pre-groove decoder (ATIP decoder) connected to the write controller for providing absolute time information; and the encoding method comprises:

receiving data of a next mode which is different from a current mode from the computer even when the encoder is still encoding data of the current mode;

storing data received by the encoder from the computer into the buffer;

using the host interface to receive data from the computer;

using the encoder buffer arbiter to store data from the host interface into the buffer;

using the encoder buffer arbiter to transfer data in the buffer to the encoder sector processor;

using the encoder sector processor to encode data transmitted from the encoder buffer arbiter according to modes of the data;

using the encoder buffer arbiter to overwrite data stored in the buffer with data encoded by the encoder sector processor;

using the subcode generator to generate sub-channel data;

using the CIRC to interleave data encoded by the encoder sector processor and stored in the buffer so as to generate main channel data;

using the modulator to convert the sub-channel data and the main channel data so as to generate a serial data stream;

using the ATIP decoder to provide absolute time information; and using the write controller to convert the serial data stream into switch commands of write strategy and outputting the switching commands with reference to the absolute time information.

2. The encoding method of claim 1 wherein the data is transmitted to the encoder through an IDE bus.

3. The encoding method of claim 1 wherein the encoder buffer arbiter includes a trigger register for generating initial triggers and change mode triggers, the encoding method further comprising:

using the trigger register to output a change mode trigger to latch last data stored in the buffer so as to notify the encoder sector processor and the subcode generator that the last data and data following the last data need to be encoded with the next mode.

4. The encoding method of claim 3 wherein the encoder buffer arbiter further includes a buffer arbiter for accessing data stored in the buffer, and a data mode field register for storing a mode type of the next mode, the encoding method further comprising:

using the buffer arbiter to access data stored in the buffer; and updating the data mode field register when receiving the change mode trigger from the trigger register.

5. The encoding method of claim 4 wherein the buffer arbiter is a DRAM arbiter.

6. The encoding method of claim 3 wherein the encoder sector processor includes a sector processor for encoding data transmitted from the encoder buffer arbiter, a first level encoder register for storing a data format of the current mode, and a second level encoder register for storing a data format of the next mode, the encoding method further comprising:

notifying the encoder sector processor that the last data and data following the last data need to be encoded with the next mode when receiving the latched data from the encoder buffer arbiter; and loading the data format of the next mode from the second level encoder register into the first level encoder register.

7. The encoding method of claim 1 wherein the buffer includes a sector data area for storing data transmitted from the host interface and data encoded by the encoder sector processor, and a Q channel program page area for storing program codes for the subcode generator, the encoding method further comprising:

storing program codes of the current mode in a first storage space in the Q channel program page area; and storing program codes of the next mode in a second storage space in the Q channel program page area.

8. The encoding method of claim 7 wherein the subcode generator includes a subcode source register for selecting a source of the sub-channel data, a sub-channel auto generator for generating sub-channel data, and a multiplexer for outputting sub-channel data, the encoding method further comprising:

using the subcode source register to select a source for receiving program codes from the Q channel program page area or receiving sub-channel data from the sector data area;

using the sub-channel auto generator to generate the sub-channel data according to the program codes if the Q-channel program page area is selected; and using a multiplexer to output the sub-channel data received from the sub-channel auto generator if the Q-channel program page area is selected or the sub-channel data received from the sector data area if the sector data area is selected.

9. The encoding method of claim 1 wherein the buffer is a dynamic random access memory (DRAM), and the encoder buffer arbiter is an encoder RAM arbiter.

10. An encoder coupled to a buffer within an optical storage device for encoding received data for storage on an optical disc, the encoder comprising:

a host interface for receiving data having a plurality of modes from a computer;

an encoder sector processor for encoding data according to the plurality of modes;

an encoder buffer arbiter being coupled to the host interface, the buffer, and the encoder sector processor for storing the data received from the host interface into the buffer, transferring the data in the buffer to the encoder sector processor, and storing the encoded data outputted by the encoder sector processor into the buffer; and a trigger register being coupled to the encoder sector processor for generating change mode triggers to indicate that last data stored in the buffer and data following the last data need to be encoded with a next mode.

11. The encoder of claim 10, further comprising a data mode field register being coupled to the encoder sector processor for indicating the next mode to the encoder sector processor;

wherein when a change mode trigger is generated by the trigger register, the data mode field register is updated with a mode type of the next mode.

12. The encoder of claim 10, wherein the encoder sector processor comprises:

a sector processor for encoding data received from the encoder buffer arbiter;

a first level encoder register for storing a data format of the current mode; and a second level encoder register for storing a data format of the next mode;

wherein the first level encoder register is for loading the data format of the next mode from the second level encoder register when notified that the last data and the data following the last data need to be encoded with the next mode.

13. The encoder of claim 10, further comprising:

a subcode generator coupled to the encoder buffer arbiter for generating sub-channel data;

a cross interleave reed-solomon code (CIRC) coupled to the encoder buffer arbiter for interleaving the encoded data outputted by the encoder sector processor and stored in the buffer so as to generate main channel data;

a modulator coupled to the subcode generator and the CIRC for converting the sub-channel data and the main channel data so as to generate a serial data stream;

an absolute time in pre-groove decoder (ATIP decoder) for providing absolute time information; and a write controller coupled to the modulator and the ATIP decoder for converting the serial data stream into switch commands of write strategy and outputting the switching commands with reference to the absolute time information.

14. The encoder of claim 13, wherein the buffer comprises:
a sector data area for storing the data received from the host interface and the encoded data outputted by the encoder sector processor, and
a Q channel program page for the subcode generator having a first storage space area for storing program codes of a current mode and a second storage space area for storing program codes of the next mode.

15. The encoder of claim 13, wherein the subcode generator comprises:
a subcode source register for selecting a source of the sub-channel data being receiving program codes from the Q channel program page area or receiving sub-channel data from the sector data area;
a sub-channel auto generator for generating sub-channel data according to the program codes if the Q-channel program page area is selected as the source, and
a multiplexer for outputting sub-channel data received from the sub-channel auto generator if the Q-channel program page area is selected as the source or the sub-channel data received from the sector data area if the sector data area is selected as the source.

16. The encoder of claim 10, wherein the buffer is a dynamic random access memory (DRAM) and the encoder buffer arbiter includes a DRAM arbiter for accessing data stored in the DRAM.

17. The encoder of claim 10, wherein the encoder is further for simultaneously receiving data of the next mode from the computer while still encoding data of a current mode, the next mode being different from the current mode.

18. The encoder of claim 10, wherein the data is transmitted from the computer to the encoder through an Integrated Drive Electronics (IDE) bus.

19. An encoding method for encoding data received from a computer for storage on an optical disc, the method comprising:
receiving data of a next mode which is different from a current mode from the computer even when data is still encoding in the current mode;
buffering the data received from the computer;
transferring the buffered data to a processor utilizing an encoder buffer arbiter;
encoding the data transmitted from the encoder buffer arbiter according to modes of the data utilizing the processor;
overwriting the buffered data with data encoded by the processor utilizing the encoder buffer arbiter;
generating sub-channel data;
interleaving the data encoded by the processor and buffered so as to generate main channel data utilizing a cross interleave reed-solomon code (CIRC);
converting the sub-channel data and the main channel data so as to generate a serial data stream;
providing absolute time information; and
converting the serial data stream into switch commands of write strategy and outputting the switching commands with reference to the absolute time information.

20. The encoding method of claim 19 further comprising outputting a change mode trigger to latch last data buffered so as to notify the processor that the last data and data following the last data need to be encoded with the next mode.

21. The encoding method of claim 20 further comprising:
accessing the buffered utilizing a buffer arbiter; and
updating the data mode field register when receiving the change mode trigger.

22. The encoding method of claim 21 wherein the buffer arbiter is a DRAM arbiter.

23. The encoding method of claim 20 further comprising:
notifying the processor that the last data and data following the last data need to be encoded with the next mode when receiving the latched data from the encoder buffer arbiter; and
loading a data format of the next mode from a second level encoder register into a first level encoder register.

24. The encoding method of claim 19 further comprising:
storing program codes of the current mode in a first storage space in the Q channel program page area; and
storing program codes of the next mode in a second storage space in the Q channel program page area.

25. The encoding method of claim 24 the encoding method further comprising:
selecting a source for receiving program codes from the Q channel program page area or receiving sub-channel data from the sector data area;
generating the sub-channel data according to the program codes if the Q-channel program page area is selected; and
outputting the sub-channel data if the Q-channel program page area is selected or the sub-channel data received from the sector data area if the sector data area is selected.

* * * * *